US005725901A

United States Patent [19]

Fox

[11] Patent Number: 5,725,901
[45] Date of Patent: Mar. 10, 1998

[54] LONG CHAINED BETA GLUCAN ISOLATES DERIVED FROM VISCOUS BARLEY GRAIN

[75] Inventor: Gregory J. Fox, Fargo, N. Dak.

[73] Assignee: Barkley Seeds, Inc., Yuma, Ariz.

[21] Appl. No.: 768,923

[22] Filed: Dec. 18, 1996

Related U.S. Application Data

[62] Division of Ser. No. 534,368, Sep. 27, 1995, Pat. No. 5,614,242.

[51] Int. Cl.$^6$ .................................................. A23L 1/10
[52] U.S. Cl. .......................... 426/618; 426/549; 426/622; 426/648; 426/658
[58] Field of Search ................................ 426/549, 618, 426/622, 648, 658

[56] References Cited

U.S. PATENT DOCUMENTS

| 1,425,033 | 8/1922 | Moffatt | 426/626 |
|---|---|---|---|
| 5,063,078 | 11/1991 | Foehse . | |
| 5,169,660 | 12/1992 | Collins et al. | 426/626 |
| 5,183,677 | 2/1993 | Lehtomaki et al. | 426/436 |
| 5,360,619 | 11/1994 | Alexander . | |
| 5,458,893 | 10/1995 | Smith | 426/549 |

OTHER PUBLICATIONS

Yoon, S.H., et al., Evaluation of Selected Barley Cultivars and Their Fracilons for β–Glucan Enrichment and Viscosity. Cereal Chemistry, vol. 72, No. 2, 1995.
Qureshi, Asaf A. et al., The Structure of an Inhibitor of Cholesterol Biosynthesis Isolated from Barley. The Journal of Biological Chemistry, vol. 261, No. 23, Aug. 15, 1992, pp. 10544–10550.

*Primary Examiner*—Helen Pratt
*Attorney, Agent, or Firm*—Rothwell, Figg, Ernst & Kurz, pc

[57] ABSTRACT

Disclosed are long chained beta glucan isolates containing beta glucan fibers from about 1 to about 6 mm in length, with purity greater than 50%. Also described are the methods to produce these compositions.

2 Claims, No Drawings

LONG CHAINED BETA GLUCAN ISOLATES DERIVED FROM VISCOUS BARLEY GRAIN

This is a divisional of application Ser. No. 08/534,368, filed Sep. 27, 1995 now U.S. Pat. No. 5,614,242.

FIELD OF INVENTION

The present invention relates to food products and their method of production. More specifically, the present invention relates to clinically active hypocholesterolaemic food ingredients with elevated levels of viscous beta glucan made from specially selected viscous waxy hulless and waxy hulless short awn barley varieties.

BACKGROUND OF THE INVENTION

High fiber products are generally considered to be healthful foods and food ingredients. There are two basic types of fiber: soluble and insoluble. Soluble fiber is soluble in aqueous solutions while insoluble fiber is not. Insoluble fiber will improve regularity and bulk formation but may do very little to lower serum cholesterol. Indeed some studies indicate that, depending on the source, insoluble fiber may actually increase serum cholesterol. Soluble fiber has been strongly linked to regularity and cholesterol reduction, and less strongly to sugar regulation in diabetics and colon cancer prevention.

Soluble fiber is highly viscous when it goes into solution and this sticky material has the capacity to tie up cholesterol precursors such as bile salts, excess sugar, and other potential carcinogenic compounds and flush them out of the body as fecal material. The water holding capacity of this material has the effect of forming a softer, more efficiently moving stool and the viscosity of this material lubricates the intestines. This is an aid to people with intestinal wall weakness or sensitivity that results in intestinal bleeding. Unfortunately soluble fiber is currently associated with large amounts of harsh insoluble fiber in products such as oat bran concentrate. The harsh insoluble fiber in such products as oat bran concentrate can tear at the intestinal walls during passage, causing bleeding and thus negating the positive effect of the soluble fiber with which it coexists.

There are many forms of soluble fiber that are used as food ingredients, many are categorized as gums. Some examples of soluble fiber food ingredients or food components are guar gum, gum Arabic, carrageenin, pectin, psyllium, and beta glucan. Most of these products are relative expensive. Pectin is relatively less expensive, plentiful and is found in fruit pulp. However, pectins can set up a hard gel in the intestines and large amounts of this material can cause intestinal blockages.

Another soluble fiber is beta glucan, or beta 1–4/1–3 glucosyl pyranose polymer. Beta glucan occurs in two common grain cereals, oats and barley which contains 5–7% beta glucan and is present in the cell walls along with other forms of fiber such as cellulose and arabinoxylan. Between 20–70% of the beta glucan found in oats and barley is soluble in warm water at 45 C. Cellulose, which is completely insoluble in warm water, is a straight chain of beta 1–4 linked glucose molecules. Beta glucan has the same beta 1–4 linkages but is staggered having beta 1–3 linkages after 4–6 beta 1–4 linkages. This results in a laminated macromolecule. This general beta glucan structure will continue for 20,000 to 100,000 glucose units. The laminations allow water molecules to fit in between the beta 1–4 layers which allows beta glucan to hydrolyze.

Beta glucan occurs as fibers in the cell wall of the starchy endosperm in barley seed. Beta glucans coexist in the cell with performed beta glucanases which are enzymes that break up beta glucan. Beta glucanases are released or activated as the seed is hydrated. Additionally as the seeds germinate, newly made beta glucanase is released from the scutellum and from the aleurone layer of the seed into the endosperm. Thus, as water is added to the seed, beta glucans are degraded and broken down into smaller units through the activity of beta glucanase. Additionally any excessive drying or dry heat will cause these beta glucan chains to break up, which in turn causes the all important function of viscosity to be lost.

Oats beta glucan, tends to be concentrated in the bran, which is the outer layer of the seed. When concentrated in oat bran fiber, the beta glucan is less than half the total fiber content with insoluble fiber being the major fiber component. Thus the harshness of the coarse bran fiber must be accepted along with the benefits of the soluble beta glucan. Additionally, oats does not have a large millable endosperm in which starch, protein, and other millable products can be stored.

However, barley is a millable grain and beta glucan is concentrated in the starchy endosperm, not in the bran layer. Thus, barley beta glucan in the endosperm cell walls can be concentrated without accumulating insoluble harsh bran fiber. Barley can be milled or pea fled to remove harsh bran fiber and germs. Pearling has the additional advantage of reducing oil content, an unwanted component of any soluble fiber concentrate. In 1981 (Fox, G. J. Dissertation, Montana State University, 1981) Fox reported that a particular variant of barley, waxy hulless, contained unusually high levels of beta glucan activity measured as viscosity, showing 4.0–10.0 times that found in normal hulled barley. Viscosity was doubled when the short awn gene was added to produce waxy hulless short awn barley. Actual beta glucan content was found to be 1.5–2.0 times that of normal barley in waxy hulless and waxy hulless short awn barley (C. E. Fastnaught et al, Genetic and environmental variations in beta glucan content and quality parameters of barley for food, submitted for publication to Crop Sci., 1995). In the last 10 years a great deal of research has been concentrated toward the development of hypocholesterolaemic foods and food ingredients from oats and barley with special emphasis on the high beta glucan waxy hulless barley. One problem is that inconsistent results have arisen from clinical studies on the hypocholesterolaemic efficacy of the two beta glucan bearing grains, oats and barley. (R. K. Newman, et al., Cereal Chem. 69(3) 240–244, 1989; J. G. Fadel, et al., Nutr. Rep. Int., 35:1049–1054, 1987). This inconsistency is due in part to the fact that the functional properties of the beta glucan are not directly related to it's content but to the viscosity that is produced in the intestines (S. Bengtsson, et al., J. Sci. Food Agric., 39:151–161, 1990; T. S. Kahlon, et al., Cereal Chem., 70(4) 435–440, 1993; J. Raloff, Food Tech., August, 1991). Intestinal viscosity is also the basis for the sugar and fecal regulation associated with soluble fiber. In almost all clinical studies the beta glucan content of the starting material is determined but not the functionality (i.e. viscosity). It is possible to have material with high levels of beta glucan but zero functionality with viscosity less than 5 cps, (R. K. Newman, et al., Cereal Food Worlds, 34:883–886, 1989; C. E. Fastnaught, et al., 1995).

Thus, previous efforts to concentrate clinically effective beta glucan have failed because there has been no effort to concentrate the true functional property of the beta glucan, which is viscosity.

Barley is somewhat unique in that it contains elevated levels of another cholesterol inhibitor, tocotrienol which is a

3 vitamin E derivative that occurs in barley pearlings, and lowers serum cholesterol levels by interfering with the biosynthesis of cholesterol. This is a completely different mechanism for serum cholesterol reduction than that produced by soluble fiber.

SUMMARY OF THE INVENTION

The present invention relates to a method of producing clinically active viscous long chained beta glucan concentrates such as flours and brans and purified isolates. One method of the present invention includes the steps of: 1) selecting barley grain having a waxy hulless genotype and viscosity greater than about 15 cps and long chained beta glucan concentration greater than about $1.0 \times 10^5$/ml of a 5% aqueous flour suspension; 2) milling said grain in such a manner to approximate the grind of a mill fitted with a 0.5 mm screen to generate a coarse barley flour; 3) screening the coarse barley flour over approximately a 420 micron mesh screen to remove the coarse bran fraction; 4) collecting the particles passing the approximately 420 micron mesh screen as a barley flour fraction; 5) classifying the barley flour fraction using mesh screens that range from about 250 to about 74 microns; 6) analyzing the resultant flour fractions for beta glucan viscosity, insuring that measured values range from about 100 to about 3000 cps; and 7) analyzing the resultant flour fractions for long chained beta glucan concentration, insuring that measured values range from about $1.0 \times 10^6$ to about $1.0 \times 10^9$/ml of a 5% aqueous flour suspension.

In another method of the present invention, a high viscosity, low oil waxy hulless barley flour having beta glucan viscosity between about 100 and about 3000 cps, a concentration of long chained beta glucan fibers, and an oil content of less than about 2%, produced by a process comprising: 1) selecting barley grain having a waxy hulless genotype and viscosity greater than about 15 cps and long chained beta glucan concentration greater than about $1.0^5 \times 10$/ml of a 5% aqueous flour suspension; 2) pearling said barley grain in such a manner that about 10% to about 20% of the seed including bran and germ layers, is abraded away; 3) milling said barley grain in such a manner to approximate the grind of a mill fitted with a 0.5 mm screen to generate a coarse barley flour; 4) screening the coarse barley flour over approximately a 420 micron mesh screen to remove remaining coarse bran fraction; 5) collecting the particles passing the approximately 420 micron mesh screen as a barley flour fraction; 6) classifying the barley flour fraction employing mesh screens that range from about 250 to about 74 microns; 7) analyzing the resultant flour fractions for beta glucan viscosity, insuring that measured values range from about 100 to about 3000 cps; and 8) analyzing the resultant flour fractions for long chained beta glucan concentration, insuring that measured values range from about $1.0 \times 10^6$ to about $1.0 \times 10^9$/ml of a 5% aqueous flour suspension.

The present invention further relates to 1) a high viscosity waxy hulless barley flour fraction with beta glucan viscosity between abut 100 to about 3000 cps and a concentration of long chained beta glucan fibers and 2) a high viscosity, low oil, waxy hulless barley flour having flour fractions with beta glucan viscosity between about 100 and about 3000 cps, a concentration of long chained beta glucan fibers, and an oil content of less than 2%.

The present invention further relates to a waxy hulless, high tocotrienol, low viscosity pea fling fraction with a tocotrienol concentration of between about 60 and about 75 mg/kg and to a method of producing this composition.

The present invention further relates to a purified long chained, waxy hulled, beta glucan isolate having purity of greater than 90% with endogenous starch and protein as the main impurities, and to a method of producing this isolate.

DETAILED DESCRIPTION OF THE INVENTION

In order to provide an understanding of several of the terms used in the specification and claims, the following definitions are provided:

Beta Glucan—the term beta glucan (beta 1–4/1–3 glucosyl pyranose polymer) is intended to refer to the name of a non starchy polysaccharide in which individual glucose molecules (20,000–1,000,000) are linked by beta 1–4 and beta 1–3 linkages. Beta Glucan is soluble in warm water (40–45 degrees Centigrade), cellulose is insoluble in water. Beta glucan is the main structural material in the cell walls of barley and oat grain.

Beta Glucan Chain Analysis—As used herein, the term beta glucan chain analysis is intended to refer to a microscopic test in which the actual length and concentration of beta glucan chain fiber is measured with a microscope (100×–400×).

Beta Glucan Concentrate—the term beta glucan concentrate is intended to describe any grain fraction derived through either dry milling or wet milling procedures that have levels of beta glucan that are appreciably higher than the starting grain material, measured either as viscosity or as a percentage.

Beta Glucan Viscosity—the term beta glucan viscosity describes the friction that is created in a solution by the presence of beta glucan chains (fibers) and is measured in cps. All beta glucan viscosities reported herein are measured on a 5% aqueous suspension of ground grain or ground grain fractions.

Bran—the term bran describes the portion of a whole ground flour or meal that when sieved sits on a U.S. #40 sieve.

Centipoise Units (cps)—the term Centipoise Units or (cps) is the name of the units commonly used to measure viscosity. By definition the fundamental unit of viscosity measurement is the "Poise", which is a material requiring a sheer stress of one dyne per square centimeter to produce a sheer of one inverse second, which has a viscosity of one poise or 100 centipoise.

Chain Length—the term chain length is a measure of beta glucan fiber length in micron, millimeters, or centimeters. Such measurements can be accomplished by mounting a measured portion (1/10th of a drop) of a beta glucan solution on a calibrated slide and viewing under 100× to 400× magnification. Long beta glucan chains are 1 mm–6 mm in length and 2–10 microns in diameter.

Course Flour—the term course flour refers to a whole grained unsifted and unsieved flour.

Drying Temperatures—the term drying temperatures refers to the ambient air temperature either naturally or artificially applied to seed as it drys to ripened grain (14% to 7% moisture). Commercial driers reach temperatures exceeding 200 degrees Fahrenheit on circulating grain. The actual seed temperature depends on exposure time and moisture content of the seed when exposed to these drying temperatures.

Fine Flour—the term fine flour describes that portion of a whole flour meal that passes a U.S. #120 mesh screen.

Flour—the term flour is that portion of a whole grained flour that passes a U.S. #40 mesh sieve.

Hammer Mill System—the term hammer mill system refers to an industrial grinder in which rotating hammers consisting of steel bars that pulverize the grain create a centrifugal force which forces the pulverized grain through a screen that has holes that may vary from 1/64 to 9/64 inch in diameter. The smaller that the screen is in hole diameter the finer the resultant flour/meal.

High Starch Flour Fraction—the term high starch flower fraction describes the fine to very fine flours derived from waxy hulless barleys that are very high in starch, i.e., 60 to 70%, as compared to the other flour fractions.

Long Chained Beta Glucan Fibers—the term long chained beta glucan fibers describes beta glucan fibers that are about 1 mm to about 6 mm in length and about 2 to about 10 microns in diameter.

Low Viscosity—the term low viscosity is defined as having less than about 5 cps.

Milling—the term milling refers to the grinding, with or without sifting and sieving of grain to produce a flour or meal. Flour is human food, meal may or may not be human food, and connotes a coarser grind than flour.

Pearling—the term pearling refers to a form of incomplete milling in which the grain is routed (tumbled) over an abrasive surface in order to remove a portion of the outer seed layers or hulls. Hulled grain like barley or rice are routinely pearled to remove the adhering hulls. Hulless grains like wheat corn on hulless barley can be pearled to remove the bran layer or the pericarp/aleurone seed layer, prior to grain milling, resulting in a cleaner flour with less bran.

Pin Milling—the term pin milling refers to another centrifugal grinding system in which grain is fed into a two-sided disc with steel pin on one or both sides, one side of the disc routes rapidly. The high radial speed of the routing disc causes pulverization of the whirring grain as it impacts on the numerous steel pins. The mill may or may not be fitted with an exit screen. Generally this type of mill produces very fine flour.

Roller Break Mill Reflux System—the term roller break mill reflux system refers to a milling scheme that includes a hammer mill to continually regrind certain sieve fractions until they are eliminated. For example, the over U.S. #40 sieve, bran fraction can be directed to a hammer mill, ground, resifted, and sieved until no more material collects on the U.S. #40 sieve. The bran is now incorporated into the other flour fractions.

Roller Break Milling System—the term roller break milling system refers to the type of mills that are used today to produce the bread, pastry, and all purpose flours used in commercial and home baking. In this system the grain is fed into a series of paired variable speed rotating drums that start by breaking open the seed and releasing starch and protein and continue the process with continued sifting sieving, and air purification of the flour. An infinite combinations of regrinding, resifting, resieving, and repurification of the flour can take place in such a system. Out of this system all the classes of flour and bran can be derived.

U.S. Sieve Number—the term U.S. sieve number refers to the size of sieve openings. Individual sieves that can be combined to form a stack with graduation to smaller sieve openings from top to bottom. A list of common U.S. sieves is depicted below:

| U.S. Sieve # | Sieve opening (microns) |
|---|---|
| 20 | 840 |
| 40 | 420 |
| 60 | 250 |
| 80 | 180 |
| 100 | 150 |
| 120 | 125 |
| 140 | 103 |
| 170 | 88 |
| 200 | 74 |
| 230 | 62 |
| 325 | 44 |
| 400 | 33 |

Udy Cyclone Mill System—the term Udy cyclone mill system refers to a high speed laboratory grinder that uses centrifugal force to spin fed grain in a radial plane across a screen with holes 0.25 mm to 2.0 mm in diameter. The smaller holed screens yield finer flour/meal, while the larger holed screens yield coarser flour/meal.

Very Fine Flour—the term very fine flour describes that portion of a whole grained meal that passes a U.S. #140 sieve.

Viscosity—the term viscosity is the measure of fluid friction. A highly viscous material is one that possesses a great deal of internal friction, it will not pour or spread as easily as material of lesser viscosity.

Whole (grained) Flour—As used herein, the term whole (grained) flour describes a whole meal derived from a grain that has been ground by any number of methods.

The growing of barley for high beta glucan products requires no special treatment. Normal agronomic practices producing normal feed or malting barley will suffice. However, the grain must be grown in an environment that is semi-arid with low levels of relative humidity around the developing seed. The semi-arid western U.S. and the desert climate of the southwest are excellent environments to grow high beta glucan barley. Grain condition at or just prior to harvest is essential for seed quality. If standing grain is subjected to prolonged exposure to rain or other types of moisture such as dew, mist, sprinkler irrigation, etc., for a period greater than 24 hours, the beta glucan quality may be lost. If grain is swathed a single rain may compromise quality because of the reduced drying rate of swathed grain. If grain is harvested by either combining or gleaning (picking up grain swaths) at a moisture too high for stable storage, i.e. greater than 14% moisture, then the grain must be dried. As long as the grain temperatures during drying do not exceed 110 degrees Fahrenheit, the grain quality is preserved.

Selected barley grain, that is bright, with no staining, no visible signs of sprouting or germination, and no evidence of mold growth, i.e., no mycelia or musty odor, and good germination power of 90% or better. This selected grain is potentially suitable as starting material for high beta glucan products. Only sound, bright, sweet smelling barley grain should be selected for the production of high quality beta glucan products.

Selected grain was tested for beta glucan viscosity levels. A representative 100 gram sample of grain was ground in a Udy Cyclone Mill fitted with a 0.5 mm screen into a fine meal. An aqueous solution/slurry adjusted to a pH of 3.0–2.5 with 5 parts barley, 95 parts acidified water was formed. This solution was placed into a 45 degree Centigrade warm water bath and gently stirred for 50 minutes bringing beta glucan chain into solution or suspension. After the long chained beta glucan extraction has been completed the solution or suspension was allowed to cool in a cold water bath for 10 minutes. This allowed the starch granules to settle and temperature to decrease to 26 degrees centigrade, or approximately room temperature. The lack of centrifugation is an important departure from normal accepted lab procedure in the treatment of this solution/suspension. The centrifugation step can spin down and break the long chained beta glucans. In the procedure described herein these long chained beta glucans are preserved and saved by allowing gentle gravitational settling rather than the harsh shearing centrifugal forces that can shear and break the beta glucan chains. Centrifugation may also spin long chained beta glucans down into the solid pellet and since viscosity is tested on the liquid supernatant above the pellet or solid settlings, this results in erroneously low viscosity readings. The viscosity of the supernatant is measured by an electrical viscometer. This meter measures the resistance that a revolving spindle records as it is rotated through the suspension/solution. Or as a falling ball apparatus, it measures the speed in seconds of a small, calibrated, falling ball as it falls down the length of a calibrated cylinder filled with a measured volume of solution. These measurements of voltage changes due to resistance to spindle travel or the time of the falling ball travel for a standard distance are converted by formula into standard viscosity units or centipoise (cps). Viscosity is reported as cps units for a 5% settled acidified aqueous solution/suspension of long chained beta glucan. In order to be used as starting material for high viscosity beta glucan products a sample of sound sweet smelling barley must achieve a viscosity reading of 15 cps or better.

Immediately after completing the viscosity testing a drop of the supernatant or 1/20 ml and a small portion of that drop, i.e. 1/10, is placed on a glass microscope slide and an equal amount of 70% ethanol is co-mingled. The ethanol causes the beta glucan chains to precipitate. The resultant suspension of beta glucan chains can be viewed under 100× or higher magnification on a calibrated slide or hemocytometer. The number of long chained beta glucan chain/ml can be determined by counting the number of long chained, (1 mm–6 mm length, 2–10 microns in diameter), beta glucan chains/field of view times number of fields of view per coverslip times two, (i.e. the ethanol dilution factor) times 200 cover slip sample volumes/ml. The described beta glucan chains can be viewed under 100× magnification in aqueous solution without the addition of ethanol but with greater difficulty. Only samples of barley that have $1 \times 10^5$ long chained beta glucans/ml will be used for the production of high beta glucan viscosity products described herein.

Once a suitable lot of seed has been identified it is ground into a meal. The grinding methods can vary but should approximate the grind of a Udy Cyclone Mill fitted with a 0.5 mm screen. Grinding waxy hulless or waxy hulless short awn barley in such a manner will yield a barley flour having a particular size that ranges from 500 microns to 44 microns, such that 50% of the particles range in size from 250 microns to 106 microns. The grinding methods can include hammer mills, roller break mills, pinmills, and other means that will pulverize the grain. Once the grain is ground, it is then sieved on a Rotap sifter sizer. The sieve fractions or percentage of material that is collected on each of a graduated series of sieves are then compared with that of a sample prepared with a Udy Cyclone Mill. If the mill fractions are of about equal percentage for each grind type then it is assumed that an adequate grind has been achieved.

Beta glucan viscosities and beta glucan chain analyses are conducted on the ground grain and compared to Udy Cyclone Mill ground to insure that quality of the beta glucan has not been compromised by grinding technique.

The sieving step can take place after grinding as a separate but related process. It can take place at the same time as the grinding. This would occur in series with the ground material flowing to a stack of sieves in a sifter box, or as rotating drum sifter sieves. In the case of a modern roller break mill, the grinding and sifting steps occur concurrently with many roller break mills ripping open seeds of grain and releasing starchy endosperm with constant sizing, sifting, regrinding, pneumatic purification, and air sifting all occurring concurrently. At the end of the process separate sieve fractions are collected. It is in the collections of these mill (sieve) fractions that the unique products derived from high beta glucan viscosity barley emerge.

The bran fraction that is collected as the overs on a U.S. #40 sieve with beta glucan viscosities ranging from 50 cps–100 cps.

However, in the flour fractions, U.S. #60 sieve to U.S. #200 sieve, an unexpected and unique result occurred. Long chained beta glucan was collected and concentrated in these coarse to fine flour fractions. Within the series of sieves from U.S. #60 to U.S. #200 individual flour fractions can be collected, which can range in beta glucan viscosity from 200 cps–3000 cps, and with concentrations of long chained beta glucan molecules ranging from $1 \times 10^6$ to $1 \times 10^9$ per ml of a 5% flour/water suspension.

A fine flour through fraction will collect somewhere below the U.S. #80 to U.S. #200 sieve with essentially no viscous beta glucan and viscosity below 5 cps.

During the sieving step grades of flour can be produced and are depicted in the Table 1. The beta glucan viscosity and microscopic long chained beta glucan analysis is measured on each sieve fraction. The beta glucan rich flour fractions can be easily identified because they have about ¾ of the bulk density of flour 0.35 g/cc. The richer beta glucan flour fractions will tend to be even lighter or 0.35–0.25 g/cc. The through flour fraction which is essentially devoid of viscosity will have normal fine flour bulk density of about 0.48 g/cc.

Table 1 presents a hypothetical sieve profile. However in real practice, different barley samples can vary greatly in amount and quality of beta glucan flours that are yielded. Most of this variability is due to differences in starting material. The starting material must have at least 15 cps viscosity and $1.0 \times 10^5$ long chained beta glucan/ml, but some samples of waxy hulless and waxy hulless short awn barley may have viscosities greater than 200 cps and a long chained beta glucan concentration that exceeds $1.0 \times 10^6$/ml of a 5% aqueous flour suspension. The flours that result from such a sample will tend to be in the ultra high viscosity range. Conversely samples with 15 cps viscosity and $1.0 \times 10^5$/ml long chain count will tend to produce high viscosity beta glucan flours. Also subtle differences in grinding technique, moisture level of seed, relative humidity of surrounding atmosphere and other factors can effect the extraction efficiency, and the sieve fractions in which the long chained beta glucan concentrate. Only by testing the resulting sieve fractions for viscosity and long chained beta glucan/ml can the desired beta glucan rich flours be identified; the bulk density factor is also used as an immediate guide to selection of flour streams rich in long chained beta glucan.

The fine flour low beta glucan viscosity fraction can be quite easily identified by it's bulk density of about 0.48 g/cc. Again, depending on the particular samples and exact milling conditions, this fraction can occur as throughs of sieve U.S. #100 sieve to U.S. #200 sieve. This sieve fraction can only be identified by measuring bulk density and beta glucan viscosity.

In order to obtain a more concentrated high viscosity beta glucan flour, individual sieve fractions may be resieved any number of times; bulk sifters like the Rotap Sifter Sizer can be run for longer periods of time, e.g. 5 to 30 minutes, and sample sizes reduced. In some cases sieve fractions may be blended to achieve a desired beta glucan viscosity and/or concentration of long chained beta glucan in a particular flour or bran fraction. While the different sieving combinations can be infinite in number, the resultant products are generally the same with the proportion of each variable to the extent that in some cases some products may be eliminated altogether. This is the case when the bran fraction is remilled continually until it passes a U.S. #40 sieve, essentially eliminating the bran fraction.

Sample collection from the sieves can be by gravity flow, manual removal, i.e. Rotap sieves are simply emptied by hand, sieve is turned over and dumped, pneumatic flow, or a combination of gravity/pneumatic flow. Since most modern milling systems are designed to minimize starch granule damage, the gravitational/pneumatic systems that are employed for collection in the modern roller break mills are generally gentle on the long chained beta glucans. However the testing steps described herein will insure that no damage from collection techniques will compromise product quality.

When pearled grain in which 10%–20% of the seed (bran/germ layers) is pearled away, is used as the starting material in the described process the same products are produced but are cleaner with less microbial activity and lower oil content, i.e.. less than 2%. The four products described in the basic invention would have an oil content of 3% or greater. All grain discoloration and microbial activity is concentrated in the outer layers of barley seed, pea fling will remove much or all of this undesirable material. Also, 90% of the oil in the seed is concentrated in the germ layer; pearling will remove much or all of the germ layer, thus greatly reducing oil content of the pearled grain. With the introduction of the pearling step an additional material is produced; which is the pearling fraction. The 10%–20% of the outer seed layer was pea fled off to produce the pearled grain for processing. Since this pearled fraction has much of the tocotrienol rich germ and aleurone layers and is high in oil, i.e.. 7% to 10%, it is a good source of cholesterol reducing tocotrienol and concentrates this material about 2.5 to 3 times (62.5 g–75 g/kg) over whole grain. The products derived from the pearled grain are shown in Table 2.

The waxy hulless and waxy hulless short awn barley used in the production of the products described in Tables 1 and 2 results in flour that will contain the soft, (100% amylopectin) waxy starch. Soft waxy hulless barley pearls differently than normal hard starch. The outer layers of normal barley chip off resulting in bigger pearling particles. The soft waxy starch barley undergoes slow abrasion of the outer layers resulting in much finer pearling particles. The result is that waxy hulless and waxy hulless short awn barley pearlings have the consistency of flour passing a U.S. #40 sieve, as compared to normal barley pearlings that are like bran, collecting over a U.S. #40 mesh. Additionally, since waxy hulless and waxy hulless short awn barley is hulless it requires less pearling to remove the germ/pericarp/aleurone layers, and the pearling product does not contain the harsh hull fiber associated with the hull material found in normal hulled feed and making varieties. Since waxy hulless and waxy hulless short awn barley types contain higher levels of long chained beta glucan than normal barley, the quality of the products produced from this barley is superior to that produced from normal hulled feed or malting barley.

When waxy hulless short awned barley is used as starting material, all flour products will be waxy hulless short awned version. Because short awned types contain a larger percentage of a large, (20 to 40 microns in diameter), starch granules than long awned barley, the resultant waxy hulless short awned grain will be softer than waxy hulless grain and the resultant flours will be softer also, containing a greater percentage of the large starch granules. Also waxy hulless short awned types contain more viscous long chained beta glucan than waxy hulless types, resulting in superior long chained beta glucan flour and bran products, and as with waxy hulless grain, the pearling fraction will come off as a flour fraction.

Heat treatment of grain is a variation of the basic invention in which the grain types described herein (waxy hulless barley, and waxy hulless short awned barley) are heat treated by cooking, steaming, infranizing (cooked with infrared rays), micronized (cooked with microwaves), roasting or popping (puffing). All these heat treatments will heat the interior of the seed to a temperature greater than 100 degrees Centigrade, over a period of time from 1 to 15 minutes. This has the effect of killing microbes and inactivating enzyme systems, such as peroxidase and lipase, within the seed that may degrade derived food products by creating off tastes and rancidity. These heat treatments will increase shelf life of the viscous long chained beta glucan flour and bran products described herein. These same heat treatments can inactivate endogenous beta glucanase enzymes that degrade beta glucan and reduce chain length and viscosity when the described long chained viscous beta glucan flour and bran products are put into neutral pH 7 aqueous solution. In order to preserve beta glucan chains all these heat treatments must be accomplished with adequate moisture in the seed, no less than 12%, or must be moisture driven processes (steaming or pressure cooking). Drying heat of 75 to 100 degrees Centigrade over a prolonged period of time, i.e., greater than 5 minutes, will destroy and break up long chained beta glucan with a resultant loss of all clinical viscosity. Heat treated barley, waxy hulless barley, waxy hulless short awned barley can also be pearled subsequent to heat treatment and then tested and sieved as per the described basic invention to yield the previously described products. These heat treated grains, either whole grained or subsequently pearled, will give rise to stabilized versions of all the previously described products.

TABLE 1

Milling Whole Grain

| Sieve Stack U.S. # | Viscosity | Products |
|---|---|---|
| Over #20 | 60 cps | Viscous Bran Fractions |
| Over #40 | 80 cps | Viscous Bran Fractions |
| Over #60 | 200 cps | High Viscosity Beta Glucan Flour |
| Over #80 | 400 cps | High Viscosity Beta Glucan Flour |
| Over #100 | 500 cps | High Viscosity Beta Glucan Flour |
| Over #120 | 800 cps | High Viscosity Beta Glucan Flour |
| Over #140 | 1500 cps | High Viscosity Beta Glucan Flour |
| Throughs | 3 cps | Low Viscosity (high starch) Barley Flour |

TABLE 2

| | Whole Grain Pearled | |
|---|---|---|
| Sieve Stack | Viscosity | Products |
| | | Pearling fraction (high tocotrienol) |
| | Milling Pearled Grain | |
| Sieve Stack U.S. # | Viscosity | Products |
| Over #20 | 60 cps | Low oil viscous bran fractions |
| Over #40 | 80 cps | Low oil viscous bran fractions |
| Over #60 | 120 cps | Low oil high viscosity beta glucan flour |
| Over #80 | 400 cps | Low oil high viscosity beta glucan flour |
| Over #100 | 500 cps | Low oil high viscosity beta glucan flour |
| Over #120 | 800 cps | Low oil high viscosity beta glucan flour |
| Over #140 | 1500 cps | Low oil high viscosity beta glucan flour |
| Throughs | 3 cps | Low oil low viscosity high starch barley flour |

EXAMPLES

The following examples are provided to further illustrate the present invention and are not intended to limit the invention beyond the limitations set forth in the appended claims.

Example 1

The method of the present invention produces both high beta glucan and high viscosity barley grain. First, a waxy hulless or waxy hulless short awn barley variety must be grown that can achieve levels of viscous beta glucan greater than 15 cps. Normal feed and malting barley is a hulled grain in which the flowering glumes are fused to the seed. The starchy endosperm consists of hard starch granules composed of straight chained amylose and branched amylopectin. The amylose serves to cement and bind the branched amylopectin to produce a hard starch granule. Waxy hulless barley is a form of the grain in which the hulls are not cemented to the seed. Thus at harvest the seed either threshes free of the hulls or they are loosely held on the seed and can be polished or blown off quite easily. The starch of the waxy grain is composed of 100% amylopectin. This results in a very soft starch granule that is far more digestible by heat, chemical, or enzymes than normal starch. Also; most barley varieties will not produce long chained beta glucans and high viscosity under any circumstances. The viscosity of beta glucan is related to two factors, content and chain length, with chain length being the dominant factor in most high beta glucan barley varieties.

The combination of the two recessive genes for waxy (wx wx) and hulless (n n) in barley produced the unexpected result of enhanced beta glucan levels. When these 2 genes were backcrossed into a number of barley varieties, the beta glucan content and viscosity always increased. Some waxy hulless barley varieties include: Bob, Wanubet, Shonkin, Waxy Hulless Robust, Waxy Hulless Azure, Waxy Hulless Excel.

By adding the short awn gene (lk2 lk2), this results in another increase of beta glucan content. The normal condition in barley is the long awn (LK2 LK2). This effect on beta glucan content will occur only in the presence of the other two waxy and hulless genes. In the case of waxy hulless types, the short awn trait will often more than double the beta glucan viscosity. Some waxy hulless short awned barley varieties include: Apollo, Waxbar, Washonupana, and Pronghorn. The waxy and short awned conditions result in no loss yield. The hulless trait results in a 10%–15% loss of yield due to hulls left in the field. This loss is more than compensated for by the increased value of the hulless gain. In a number of these varieties the waxy gene by itself is enough to increase beta glucan above the 15 cps level of viscosity.

While beta glucan content can be increased significantly with the incorporation of the waxy, hulless and short awn genes (wx wx, n n, lk2 lk2), there are certain existing varieties that are not (waxy hulless) but still have very high levels of beta glucan and beta glucan viscosity. It has been observed that these varieties have very thick cell wall. The malting variety Azure is an example of such a variety. When the waxy and hulless genes are added to such a variety the beta glucan levels increase to a new plateau. For example; a sample of Azure dan achieve viscosities in the 25–30 cps range. The waxy hulless version of Azure can achieve viscosities in the 100–250 cps range. Most waxy hulless barley varieties have viscosities that fall in the 15–60 cps range, most waxy hulless short awn barley varieties have viscosities in the 20–100 cps range. Normal hulled feed and making barleys have viscosities in the 3–5 cps range.

Example 2

For best results, waxy hulless or waxy hulless short awn barley should be planted on well drained soil with good fertility levels. Generally, beta glucan concentration is highly correlated with protein concentration. Thus, waxy hulless barley or waxy hulless short awned barley, unlike malting barley, can be grown on soil with high levels of nitrogen. As previously described, beta glucanase breaks down beta glucan molecules. Beta glucanase is important in the germination process, and is activated by moisture imbibed by mature or nearly mature seed. Thus even if the high beta glucan waxy hulless and waxy hulless short awn barley types are grown in perfect semi-arid environments; the beta glucan content and more importantly quality, i.e. viscosity and chain length can be eliminated if the mature or nearly mature grain is wetted by rain, dew, high atmospheric humidity, or poorly aerated windrows. Therefore, timely harvest is essential. Rain on standing heads is not a serious problem if heads can air dry within 24 hours.

The crooked head, as exemplified by Western Plant Breeders varieties, Antelope and Pronghorn, is a great aid in drying and allows efficient drying when compared to an erect upright head. Swath grain that is rained upon presents a far more serious problem. If possible, waxy hulless or waxy hulless short awn barley should be straight cut by a combine. For a perfect sun cured crop of waxy hulless or waxy hulless short awn barley, it is far better to harvest early, i.e., any time grain moisture falls below 35% rather than allow unwanted precipitation to rain the viscous beta glucan yield. Grain fill and beta glucan accumulation is complete at 35% grain moisture.

Grain can be harvested any time after reaching 35% moisture and dried gently, i.e., 110 degrees F. to a storage moisture level of 11–13%. Waxy hulless and waxy hulless short awn barley must be harvested and gleaned in an extremely gentle fashion. 50% or more of the cemented hull should remain with the seed. The hull will protect the seed from abrasion and the presence of a high percentage of uncemented hull indicates that those seeds that were hulled in the harvest process are undamaged. Scratches or gouges on the seed will speed up the inhibition of moisture and respiration which activates the beta glucanases, which break down the valuable beta glucan chains. If grain drying is necessary, it shall be done with ambient air circulation at very low temperatures, i.e., 110 F.–120 F., in a grain dryer. Excessive drying and heat can severely degrade beta glucan chains; this results in reduced beta glucan viscosity when this material is used in food products. The cause of this phenomena is not completely understood but it is thought that the shearing and heaving forces created as these fibers dry too rapidly or too severely cause breakage in the beta glucan molecular chain. Once the grain is dried, storage becomes a serious concern. Any rapid fluctuation of temperature resulted in beta glucan damage. Grain can be stored at ambient temperatures but aeration must be used when rapid fluctuation of temperatures might occur.

Example 3

It has been found that by grinding and sieving waxy hulless and waxy hulless short awn barley grain that is high in beta glucan and beta glucan viscosity, that a low (0.35–0.25 g/cc) bulk density fraction occurs in the flour range as the overs of U.S. #60 to U.S. #200 sieves. This material will have viscosities that are 10 to 30 times that of the staffing material. There will be a fine flour fraction that falls beneath the high viscosity fraction, with a bulk density of about 0.48 g/cc, and has little or no viscosity. The bran fraction is removed as the overs on a U.S. #40 sieve. This same phenomena was observed in pearled, and/or heat treated barley gain. Grain is often heat treated to inactivate enzymes systems that degrade grain quality and this in turn increases shelf life. These heat treating processes can include cooking, steaming, instantizing, micronizing, infranizing, etc. Often starch granules are pasted in such processes, and this creates false beta glucan viscosity readings. In order to evaluate heat treated material the physical presence of the beta glucan chains must be confirmed.

Under microscopic evaluation it was observed that these high viscosity sieve fractions contained at least $1.0 \times 10^9$ long chained beta glucan fibers (1 mm–6mm in length, 2–10 microns in diameter)/ml of a 5% (flour/water) acidified (pH 2.5–3.0) aqueous solution. It was discovered that the viscosity of the fraction was related to the number of long chained beta glucan fibers/ml of solution.

| CPS Range | Long Chained Beta Glucan/ml |
| --- | --- |
| 200–500 | $5.0 \times 10^8$ to $1.0 \times 10^9$ |
| 500–1000 | $1.0 \times 10^9$ to $2.0 \times 10^9$ |
| 1000–3000 | $2.0 \times 10^9$ to $4.0 \times 10^9$ |

Also, smaller portions of extremely long beta glucan chains were observed 1 to 10 cm in length. This microscopic method of evaluating beta glucan quality was termed beta glucan chain analysis. Only by using microscopic beta glucan chain analysis and beta glucan viscosity test together can the true clinical value of heat treated seed be determined, because some of the viscosity in these materials can be created by pasted starch. The concentration of intact long chained beta glucan fiber confirm clinical functionality of such material.

The length of the beta glucan strands far exceeded the size of the starch granules and actually exceeded the length or width of the cells from which they are derived. The actual physical length of beta glucan molecules was never thought to be of this dimension. The molecules must be interwoven and overlapped to fit into one cell wall. Possibly this material is contiguous from cell wall to cell wall i.e., it transverses multiple cells. These beta glucan strands are not dissolving in water as was previously thought but remained in suspension as whole hydrated strands. Upon hydration they expand which is why more and more are seen over time and temperature which speeds up the kinetics.

Example 4

The strands and chunks of cell wall material are collected on top of the U.S. #80–200 sieves while the starch granules fall through the holes. When high viscosity waxy hulless and waxy hulless short awn barley was pearled prior to milling or sieving, the beta glucan concentration of these light flour fractions was increased by 7–19% and the oil content of the concentrate reduced from 3–1%. The process of the present invention works well with both pearled and unpearled grain. One preferred embodiment is the processing of pearled stabilized waxy hulless, or waxy hulless short awned grain. Pearling removes harsh bran fiber which has limited clinical value. Also the bran contains no long chained beta glucans so removal of the bran improves the beta glucan concentrate fraction. Removal of the germ which occurs in pearling, lowers the oil content since oil is concentrated in the germ, and removes the main source of rancidity.

Unexpectedly, the pearling fraction which came off as a fine powder and has almost no viscosity. Barley bran oil contains relatively high levels of a vitamin E derivative that lowers cholesterol by a completely different mechanism than that of beta glucan. These compounds are called tocotrienols and they reduce serum cholesterol by actually interfering with the synthesis of cholesterol in the liver (A. A. Qureshi et al, The structure of an inhibitor of cholesterol biosynthesis isolated from barley. J. Biol. Chem. Vol 261: 10544–10550 (1992)). Oats does not have exceptional levels of tocotrienol. Thus waxy hulless barley is the only cereal that contain two powerful cholesterol reducing agents: long chained beta glucan and tocotrienols. Because of this, the pearling fraction takes on added value as a concentrated source of tocotrienol which has been stabilized to avoid rancidity (always a problem with bran products), thus it is a high quality source of tocotrienol and a valuable product of our beta glucan concentration process. Clinical studies have established the efficacy of both pearled high beta glucan waxy hulless and waxy hulless short awn barley flour and the tocotrienol rich pearling fraction in serum cholesterol reduction.

Example 5

The mode of milling had a large and unexpected effect on the quality of derived high viscosity beta glucan flours. When a Udy Cyclone mill was used, the pore size of the filter screen had an influence on the soluble fiber content and associated viscosity. As the pore size decreased from 3.0 mm to 0.5 mm the soluble fiber increased. This same effect was seen in the hammer mills along with an additional factorpower. When filter screen size was held constant, the more powerful mills yielded higher levels of soluble fiber. Finally, the more sophisticated roller break mills designed to rip open the seed endosperm releasing starch granules and protein bodies yielded even higher levels of soluble beta glucan. Just as the aforementioned heat treatments released beta glucan from the cell wall by physical heaving and shearing forces that break up cell walls and release beta glucan strands, so did these milling techniques. They provide powerful shearing and ripping forces that release additional beta glucan chains from the cell wall, beyond that which can be released by heating alone.

The sifting and sieving associated with each milling system also had an influence on soluble beta glucan extraction and yield. The more of the spherical starch granules that can be sifted away from the beta glucan fibers, the more concentrated the beta glucan concentrate becomes. Again the more sophisticated roller break mill system with the rapid flow rate and the self cleaning sieve screens is more effective than a static stack of sieves on a Rotap sifter. In general, sifting motion is gentle on the beta glucan strands. Air classifications systems that rely on a great deal of centrifugal force break up the valuable beta glucan strands. A sifting system that gently shakes the starch granules loose without breaking the beta glucan chains is an excellent system to concentrate beta glucan chains as a dry milled product.

The beta glucan concentrate, i.e., the light flour fraction derived from the raw flour of high viscosity waxy hulless and waxy hulless short awn barley contain endogenous beta glucanase which break up the beta glucan upon hydration and quickly destroy viscosity. The human digestive system quickly inactivates this enzyme with a highly acid stomach pH of approximately 2.5 and potent protease activity in the stomach and intestines. Thus the high viscosity waxy hulless and waxy hulless short awn barley retains it's functionality in the human digestive system. Also, food preparation, such as cooking or boiling will destroy this beta glucanase activity with temperatures above 100 C. However in the preparation of food products where hydration of the beta glucan concentrate must occur at a neutral pH range such as above 3 and below 10, and there is no cooking step, then the physical functionality and viscosity can be lost. This may be a product formulation problem when the concentrate is used as a gum or hydroscopic food ingredient, and may be a clinical problem if viscosity is lost before ingestion by human subjects. Thus to insure optimum efficacy and functionality of any high beta glucan product or concentrate, it is necessary to inactivate the beta glucanase enzyme that coexist with the beta glucans. The methods that can be used to inactivate beta glucanase include steam cooking, roasting, puffing, infranization and micronization. All these methods generating heat in the seed to destroy enzyme activity.

Example 6

In food products, the stability of the high viscosity waxy hulless and waxy hulless short awn barley concentrate imparted by the aforementioned techniques also inactivates other undesirable enzyme systems including peroxidase, lipases, proteases and amylases which cause poor taste, reduce quality, and shorten shelf life. This stability greatly enhances the attractiveness and usefulness of a high viscosity beta glucan concentrate as a food and food ingredient. It also enhances the value of the by products of the concentration process, yielding stable flour, bran, and germ fractions. As described earner, the waxy hulless or waxy hulless short awned barley is stabilized as grain as soon after harvest as is possible. Thus the stabilization step was conducted on the front end of the processing described herein; that is, before milling and sifting.

Example 7

A sample of high beta glucan, high viscosity (20 cps) waxy hulless barley (Merlin) was milled using a Udy Cyclone Mill fitted with a 0.5 mm screen. 350 grams of the flour was fed into a Rotap Sifter Siever with the following stack of sieves. Viscosities were conducted at a pH of 25.

The following sieve fractions were obtained:

| Sieve Fraction U.S. # | | Viscosity | | Long Chained Beta Glucan/ml of So- |
|---|---|---|---|---|
| thru | over | Yield | (cps) | lution/Suspension |
|  | 60 | 12.2 | 135 | $3.0 \times 10^8$ |
| 60 | 80 | 26.0 | 488 | $1.0 \times 10^9$ |
| 80 | 100 | 45.4 | 6 |  |
| 100 | 120 | 15.7 | 2 |  |
| 120 |  | 0.6 | 2 |  |

Example 8

A sample of high beta glucan viscosity (20 cps) waxy hulless short awned barley (Apollo) was infranized (heat treated with infrared waves) to inactivate peroxidase and lipase enzyme systems. The infranized grain (33.4 cps) was ground in a Udy Cyclone Mill fitted with a 0.5 mm screen. One hundred grams of the resultant flour was fed into a Rotap Sifter Siever with the following stack of sieves measured as U.S. Mesh numbers and run for 10 minutes.

The following sieve fractions were obtained (viscosities were conducted at a beta glucanase inactivating pH of 10):

| Sieve Fraction U.S. # | | | |
|---|---|---|---|
| thru | over | Yield | Viscosity (cps) |
|  | 60 | 18.6 | 67.8 |
| 60 | 100 | 19.0 | 175.9 |
| 100 | 140 | 9.2 | 647.1 |
| 140 |  | 53.3 | 6.6 |

Example 9

A sample of high beta glucan high viscosity (40 cps) waxy hulless barley Wanubet was heat roasted in silica media to produce a sample of puffed gain. The puffed grain was pin milled and then run for 30 minutes in a Rotap sifter siever with the following stack of sieves measured as U.S. mesh numbers.

The following sieve fractions were obtained:

| Sieve Fraction U.S. # | | |
|---|---|---|
| thru | over | Viscosity (cps) |
| 40 | 80 | 26 |
| 80 | 100 | 12 |
| 100 | 140 | 135 |
| 140 | 200 | 400 |
| 200 |  | 3 |
| Water |  | 3 |

Example 10

A sample of high beta glucan, high viscosity (40 cps) waxy hulless barley Wanubet was heat roasted in a gas-flash roasting system to produce a sample of very high beta glucan popped grain. The whole grain was hammer milled and then run for 30 minutes in a Rotap sifter sizer with the following stack of U.S. mesh sieves.

The following sieve fractions were obtained:

| Sieve Fraction U.S. # | | Sample wt. (g) | Viscosity (cps) |
|---|---|---|---|
| thru | over | | |
| 20 | 40 | 28.4 | 58 |
| 40 | 80 | 84.0 | 350 |
| 80 | 100 | 25.3 | 800 |
| 100 | 140 | 28.0 | 400 |
| 140 | 200 | 22.4 | 400 |
| 200 | | 113.6 | 3 |
| Water | | | 3 |

Example 11

A sample of high viscosity (40 cps) waxy hulless short awn barley Apollo was pearled to remove bran and germ seed component, about 15% of the total seed weight was removed. The grain was then hammer milled to pass a 4/64 inch fractionated on a Rotap sifter siever. with the following sieve fractions obtained:

| Sieve Fraction U.S. # | | Sample | | Long Chained Beta Glucan per ml of |
|---|---|---|---|---|
| thru | over | Wt. | Viscosity cps | solution/suspension |
| | 80 | 219 g | 218 | $5.0 \times 10^8$ |
| 80 | 120 | 18 g | 1240 | $2.0 \times 10^9$ |
| 120 | | 159 g | 3 | |

Example 12

A sample of high viscosity (20 cps) waxy hulless short awn barley Apollo was flaked and instantized using the patented equipment and processes of Flakee Mills, Lincoln, Nebr. under U.S. Pat. No. 5,360,619. The grain was then coarse milled and then remilled through a Udy Cyclone Mill fitted with a 1 mm screen. The viscosity of the samples derived from that process are listed below:

| | Instantized Flour Viscosity | |
|---|---|---|
| | Viscosity (cps) | |
| Treatment | pH 7.0 | pH 2.5 |
| Untreated Flour | 2.0 | 20.0 |
| Coarse Grind | 9.0 | 139.0 |
| Fine Regrind | 7.0 | 575.0 |

Example 13

The coarse meal was remilled to flour in a roller break reflux mill at Roman Meal Milling in Fargo, N. Dak. The coarse meal went through roller break mills, reduction roller mills, and purifier rolls. Particles collected on a U.S. #40 mesh sieve were refluxed to a high powered hammermill fitted with a 3/64 inch round holed screen reground and fed back to the reduction/purifier rolls; this was done continuously until the over U.S. #40 sieve fraction was eliminated. The U.S. #40 over #80 fraction was collected, along with the U.S. #80 sieve fraction. The yield and viscosity of those fractions are listed below:

| Mill Fraction Summary for Instantized Waxy Hulless Short Awn Barley | | | | |
|---|---|---|---|---|
| Mill Fraction U.S. # Sieve | | | Viscosity (cps) | |
| thru | over | Yield (%) | pH 7.0 | pH 3.0 |
| 40 | 80 | 16 | 8 | 33 |
| 80 | | 84 | 70 | 2463 |

The bran fraction that is derived from this process is quite valuable as a by-product. It is a good source of partially digested bran fiber with high levels of soluble fiber or beta glucan. Also it should be emphasized that the instantization process partially stabilized both the bran and patent flour fractions for lipase and peroxidase activity this will extend shelf life of both products.

Example 14

A sample of high viscosity, i.e., 20 cps, waxy hulless short awn barley variety Apollo, was stabilized with infrared energy using the patented equipment and processes of Flakee Mills. Lincoln, Nebr. in U.S. Pat. No. 5,024,145. This process had the effect of inactivating the endogenous enzyme systems such as lipases, peroxidases, beta glucanases, proteases, and amylases. A sample of this grain was milled on a Udy Cyclone Mill fitted with a 1 mm screen. The viscosity of this material was measured at a pH of 7, i.e., 15 cps and at a pH of 3.0, i.e., 28 cps. This material was reground on a Udy Cyclone Mill fitted with a 0.5 mm screen. The viscosity of this material was measured at a pH of 7 (23 cps) and at a pH of 3 (140 cps). As expected the finer grind enhanced the extraction of soluble beta glucan from the cell walls which was evidenced by the higher viscosities for the finer ground samples. 100 grams of the finely ground, using a 0.5 mm screen, whole grain flour was placed in a Rotap Sifter Siever with the following stack of U.S. mesh screens, and sifted for 10 minutes.

The following sieve fractions were obtained:

| Sieve Fraction U.S. # | Yield (grams) | Viscosity (cps) at pH 7 |
|---|---|---|
| 40 over 60 | 1.4 | 17 |
| 60 over 80 | 23.6 | 368 |
| 80 over 100 | 14.7 | 530 |
| 100 over 140 | 47.5 | 7 |
| 140 over Pan | 11.1 | 6 |
| thru Pan | 5.1 | 5 |
| Water | | 3 |

The result of this procedure produced a number of desired and unexpected results. The soluble long chained beta glucans accumulated almost entirely on the over U.S. #80 sieve fraction. It should be noted that there really was no U.S. #40 over U.S. #60 sieve fraction. The material on the U.S. #40 sieve was composed entirely of fine material that refluxed up through the lower screens. The fineness of the grind essentially eliminated this material. The cleanness of the separation of the long-chained beta glucan from the high starch was unexpected. The 39.7% yield of beta glucan concentrate or the over U.S. #80 fractions, was much higher than expected. Based on the above fractionation analysis a commercial scale procedure was designed and conducted on about 3000 lbs of grain. The steps in that process are the following: 1 ) The stabilized waxy hulless short awn barley grain was pearled to remove bran fiber and germ fractions.

This was accomplished with a Sataki rice dehuller. 2) The pearling fraction came off as an attractive fine textured fraction, comprising about 15% of the seed weight. 3) The pearled stabilized grain was milled and fractionated using the Roller Break Reflux Milling System of Roman Mill Milling, Fargo, N. Dak. This milling system is a proprietary system developed by Roman Meal Milling as an all purpose, flexible, grinding, and fractionation system. The mill was set up with the following stack of screens:

| Roller Break Reflux Mill Sieve Stack | | |
|---|---|---|
| U.S. # Sieve | | |
| thru | over | |
|  | 40 | Coarse Particle Collector |
| 40 | 80 | Mid Range Particle Collector |
| 80 |  | Fine Flour Collector |

The pearled grain was introduced into the system and run through the roller break mills, reduction roller mills, and purifier rolls. Particles collected on a U.S. #40 sieve were refluxed to a high powered hammermill fitted with a 3/64 inch round holed screen, reground and fed back to the reduction/purifier rolls; this was done continuously until the over U.S. #40 sieve fraction was eliminated. The U.S. #40 over U.S. #80 sieve fraction was collected, along with the over U.S. #80 sieve fraction, and thru U.S. #80 sieve portion. The yield and viscosity of those fractions along with the pearling fraction are listed below.

| Mill Fraction Summary for Stabilized Waxy Hulless Short Awn Barley | | | |
|---|---|---|---|
| | | Viscosity (cps) | |
| Mill Fraction | Yield(%) | pH 7.0 | pH 3.0 |
| Pearlings | 13.6 | 3 | 3 |
| Over U.S. #80 Sieve | 34.7 | 978 | 331 |
| thru U.S. #80 Sieve | 51.7 | 19 | 190 |

The yield and quality of the stabilized long chained, beta glucan, ultra high viscosity concentrate, i.e., the over #80 U.S. sieve fraction had a yield of 34.7% of total finished product and a viscosity of 978 cps (pH 7).

The pearling fraction is most interesting in that it is totally devoid of beta glucan activity when measured as viscosity. The germ and bran of barley contain another cholesterol-reducing compound called tocotrienol, that lowers cholesterol by a completely different mechanism than the viscous beta glucan. Tocotrienols is a fat soluble Vitamin E derivative which inhibits the production of cholesterol in the liver. Thus, this pearlings fraction is a stabilized tocotrienol concentrate, which in itself is a valuable food ingredient. The separation that the pearling step provides removal of the fat concentrated in the germ where it is a liability. Low fat high beta glucan flours are the desired product. Pea fling reduces the fat content in both products from 3% to about 1%, and puts the fat where they are valuable, in a tocotrienol concentrate.

Example 15

The products that have been described in Examples 9 through 14 would have some unique product applications.

The heat treated and non-heat treated ultra high viscosity beta glucan (dry milled) extracts would be useful as a sure source of clinically active beta glucan to be used as an ingredient in baked food products. Both can be used in place of other less active forms of fiber supplement such as oat bran, wheat bran, and many other products. These products can also serve as ingredients in processed foods such as extruded cereals, i.e., flakes, nuggets, o's, etc. and other cooking processes. Cooking enhances the clinical properties of this material. This material can also replace some non-cereal based components of food products in baked goods for example, the added fats and gums can be replaced with this product. In foods such as hot dogs and hamburgers, this material can be used as a water binding agent and fat substitute. In short, this material is an excellent source of clinically active soluble fiber, that can be blended in a wide range of food products. It's presence in these food products often allows the removal or reduction of other less desirable ingredients such as oils, and gum.

The concentrates that were derived from pearled grain would be used in the same applications that were described above. However, the lower oil content of about 1% renders them more desirable ingredients for many product applications.

The by-products derived from the above examples, also have useful economic value. The high starch fractions contain high levels (70%) of waxy starch which has great value as an industrial starch. The high starch fractions from all examples can be used as high grade starting material for starch, syrup, glucose, maltose, fructose, sugar or ethanol production. These fractions can also be used as flour with special value as cookie flour. A most attractive use of the isolated starch fractions would be for use as adjunct, or starch source, in the beer brewing process. At the present time barley is not used in this process as adjunct because of excessive levels of viscous beta glucan. It is for this reason that corn grits and rice serve as the starch source in the mash cook of starchy grain and malted barley to form the sweet wort which is then fermented to beer. The aforementioned milling and sieving steps remove the unwanted long chained beta glucans rendering a non viscous starch source. This should be attractive to brewers, allowing production of an all barley beer, with an adjunct that contains all the flavor components favorably associated with beer. This adjunct also has the advantage of being composed entirely of soft waxy starch, which would reduce the mashing temperature requirement by 20 C. because waxy barley starch dissolves in water at a temperature (55 C. vs. 75 C.) that is 20 C. lower than normal. The bran fractions can be used in the same fashion as oat bran and other such products with an advantage of relative low fat content of 2–3% versus oat bran's 7–9%. The pearling fraction created in Example 11 has special value in that the outer layers of the seed are targeted for removal in the pearling process. This manner of bran removal has the effect of removing the bran and the germ material as a single fraction. This has the effect of concentrating Tocotrienol, an oil soluble vitamin E derivative, which is an additional cholesterol reducing agent which is contained in barley but not oats. The pearling fraction can be used in the same manner as wheat germ as a cereal based food ingredient however with the benefit of a cholesterol reducing agent not contained in wheat germ (oat germ does not exist since it is not commercially possible to remove and concentrate the oat germ).

Example 16

Comparisons of yield, percent beta glucan, and beta glucan viscosity among samples of waxy hulless barley and corresponding normal hulled parental types were obtained at Fisher, Minn. in 1992. Beta glucan concentration analyses were conducted by the University of Minnesota. Viscosity tests were conducted at North Dakota State University. All waxy hulless barley varieties were developed by and are the property of Western Plant Breeders/Barkley Seed Inc.

| Variety | Yield (bu) | Beta Glucan Percentage | Viscosity |
| --- | --- | --- | --- |
| Robust | 80.58 | 4.9 | 4.93 |
| Waxy Hulless (WH) Robust | 74.89 | 6.9 | 21.59 |
| MN 562 | 64.49 | 4.9 | 4.99 |
| MN 562 | 63.40 | 7.9 | 44.35 |
| Excel | 85.80 | 5.1 | 7.31 |
| WH Excel | 79.13 | 8.0 | 55.12 |
| Azure | 95.53 | 5.3 | 21.85 |
| WH Azure | — | 8.3 | 261.11 |
| MN574 | 79.13 | 4.4 | 2.78 |
| WH 574 | — | 7.7 | 29.44 |

This example clearly illustrates the striking difference between normal barley and clinically active viscous barley, which in this case are primarily waxy hulless types. The normal hulled barley Azure also qualifies with viscosity greater than 15 cps. Not all samples of azure can achieve this level of viscosity.

Example 17

During microscopic beta glucan chain analysis, a series of observations were made. The beta glucan chain lengths were maintained in an acidified (pH 2.5–3.0) aqueous solution (5% flour/water) for about 4 hours. The addition of ethanol to the solution had been diluted 10 to 1 with water resulting in a viscosity of 5 cps or less. Accompanied by gentle stirring this resulted in the long chained beta glucans diving to the bottom of the slide while the suspended starch granules remained suspended and were subsequently washed away with water. The resulting concentration of long chained beta glucan fiber was left adhering to the slide. Repeated washing with water removed all starch with a resulting pure beta preparation of clinically active long chained beta glucan.

This method of isolating and purifying beta glucan is far superior to any existing method that employs elevated temperatures (100 degrees Centigrade), and the use of enzyme systems to remove starch and protein, and many digestion, washing, centrifugation, washing and purification steps, rendering such procedures economically unfeasible. This method on the other hand can be easily applied in a commercial setting. It should be noted that the unique aspect of this invention is that the beta glucan chains are treated as suspended fiber, not dissolved molecules.

What is claimed is:

1. A purified long chained, waxy hulless, beta glucan isolate, which has a purity of beta glucan isolate greater than 90% with a beta glucan viscosity from 100–3000 cps, with endogenous starch and protein as main impurities, produced by a process which comprises the steps of:

selecting high viscosity waxy hulless barley flour with beta glucan viscosity greater than 15 cps and a long chained beta glucan concentration greater than about $1.0 \times 10^5$/ml of a 5% aqueous flour suspension;

making an acidified aqueous flour suspension of this material;

extracting the beta glucan chains by bringing the acidified suspension to about 45 degrees Centigrade, with slow agitation;

diluting the acidified solution with acidified water;

gently stirring the acidified suspension while adding ethanol, precipitating long chained beta glucan;

removing supernatant, washing precipitated beta glucan chains with acidified water to remove adhering starch;

evaluating microscopically the precipitated beta glucan chains to insure length of about 1 mm to about 6 mm; and drying the beta glucan chains to between about 14% to about 7% moisture, never exceeding drying temperatures of about 35 degrees Centigrade.

2. The long chained beta glucan isolate of claim 1, wherein the said isolate is made from high viscosity waxy hulless short awn barley flour.

* * * * *